(12) United States Patent
White et al.

(10) Patent No.: US 6,949,858 B2
(45) Date of Patent: Sep. 27, 2005

(54) INSULATED CODE STUD FOR ROTOR AND STATOR LAMINATIONS

(75) Inventors: Michael Walter White, Peterborough (CA); Pierre Doyon, Peterborough (CA); Arezki Merkhouf, Ennismore (CA); John Menzies, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 0 days.

(21) Appl. No.: 10/781,764

(22) Filed: Feb. 20, 2004

(65) Prior Publication Data

US 2004/0174086 A1 Sep. 9, 2004

(30) Foreign Application Priority Data

Mar. 6, 2003 (CA) .............................................. 2421606

(51) Int. Cl.[7] .................................................. H02K 1/06
(52) U.S. Cl. ........................................ 310/217; 310/216
(58) Field of Search ................................ 310/216–218, 310/254, 258–259, 261

(56) References Cited

U.S. PATENT DOCUMENTS 2,406,045 A * 8/1946 Stevens ........................ 336/73
3,447,010 A * 5/1969 Vreeland ..................... 310/217
4,494,030 A   1/1985 Mulach et al.
6,636,052 B2 * 10/2003 Hurley et al. ............... 324/541
6,741,010 B2 * 5/2004 Wilkin ....................... 310/268

FOREIGN PATENT DOCUMENTS

DE         20 06 995 A    9/1970
JP         11 266555 A    9/1999

* cited by examiner

Primary Examiner—Thanh Lam

(57) ABSTRACT

An insulated core stud for use in the core structure of at least one of a stator and a rotor of a dynamoelectric machine is adapted to pass through holes contained in laminations of the core structure. The insulated core stud has a central portion and a first layer of heat shrinkable tubular insulation shrunk fit onto and covering at least the central portion of the core stud that passes through the laminations. One or more additional layers of heat shrinkable tubular insulation are shrunk fit onto at least a portion of the first layer of insulation that passes through the laminations. These second layers provide mechanically protection to the underlying layers of insulation against breaks occurring in the electrical insulation when the laminations and core studs are assembled into the core structure.

13 Claims, 2 Drawing Sheets

… (1) …

INSULATED CODE STUD FOR ROTOR AND STATOR LAMINATIONS

FIELD OF THE INVENTION

The present invention relates to a core stud for use in a rotor or stator core of a dynamoelectric machine where the core stud is insulated from the core.

BACKGROUND OF THE INVENTION

In the manufacture of stator and rotor cores for dynamoelectric machines, it is common practice to build these cores from a series of punched laminations. The laminations are assembled in abutting relationship to each other in a stack that runs axially along the machine. The axial ends of the stack of laminations are closed off by end plates which provide compression forces to the laminations. The laminations are typically provided with a plurality of through holes which also extend through the end plates. Through bolts or core studs typically pass through the through holes of the laminations and the end plates. The core studs have end portions which extend beyond the end plates. The core stud end portions are usually threaded to receive nuts and other washers which when tightened press against the end plates to provide axial tightness of the core assembly.

It is also known to electrically insulate the laminations in the core from each other by coating the laminations with an inorganic insulated material so that there is no current that would normally pass between the laminations. To prevent electrical losses through the core and the core studs, it is known to insulate the core studs. Typically, this insulation comprises taping of the core studs or painting the core studs with an insulated material. However, the electrical insulation between the laminations and core studs may be compromised when the core studs are inserted into the through holes in the laminations. The problem is that the through holes provide relatively sharp edges of metal or iron that may shred or cut into the insulation of the core stud. Consequently, electrical shorting may occur from the laminations through the core stud.

U.S. Pat. No. 4,494,030 issued Jan. 15, 1985 to Mulach et al. shows a stator core structure for a dynamoelectric machine having a plurality of core studs that extend through the laminations. In addition to these core studs that extend through the lamination, there is disclosed radial outer core studs that extend through the stepped iron, the finger plate, the end plate and the end shield. These outer core studs are insulated with insulative cylinders that are slipped over the outer core studs in the region of the stepped iron. The insulative cylinders are used in this region to prevent electrical communication between the outer core studs and the end shield. These insulative cylinders are slid over the outer core studs. The cylinders are able to slide relative to the outer core studs and must be held axially in place by additional plate layers at the axial ends of the step iron.

There is a need to provide for insulation affixed to the core stud used in the core assembly of rotors and stators of dynamoelectric machines that provides for protection of the insulation from the laminations during the assembly of the core structure.

SUMMARY OF THE INVENTION

The present invention relates to an insulated core stud for use in the core structure of at least one of a stator and a rotor of a dynamoelectric machine. The insulated core stud, also known as a through bolt, is adapted to passing through holes contained in laminations of the core structure. The insulated core stud has a central portion, and a first layer of heat shrinkable tubular insulation shrunk fit onto and covering at least the central portion of the core stud that passes through the laminations. The application of a heat shrinkable tubular insulation permits for the tubular insulation to be readily slid over the core stud and subsequently affixed thereto by shrink fitting during a heating step. This results in a labor cost savings over the use of insulation tape wound onto the core stud and also provides a mechanically stronger uniform layer of insulation over the core stud that is less susceptible to rupture or damage during assembly of the core stud into the core.

Additionally, the insulated core stud may comprise a second layer of heat shrinkable tubular insulation shrunk fit onto and covering at least a portion of the first layer of insulation that passes through the laminations. This second layer provides a uniform mechanically protective layer to the underlying first layer of insulation and provides additional protection against breaks occurring in the electrical insulation when the laminations and core studs are assembled into the core structure.

It should be understood that additional succeeding layers of heat shrinkable tubing may be shrunk fit over the second layer and each preceding layer to further enhance mechanical protection properties provided by the insulation. Alternatively if thinner layers are utilized, this may require more than two layers of heat shrinkable tubular insulation being used.

In accordance with an aspect of the present invention there is provided a dynamoelectric machine comprising a stator and a rotor. At least one of the stator and rotor has a core structure comprising a plurality of magnetic laminations spaced axially along the core structure. The core structure has a plurality of through holes passing axially through the laminations and an insulated core stud passing through each of the through holes. The insulated core stud comprises opposing ends, a central shaft portion, and a first layer of heat shrinkable tubular insulation shrunk fit onto and covering at least a portion of the central shaft portion of the core stud that passes through the laminations. The core structure has nuts secured to the opposing ends of the insulated core studs whereby the nuts and core studs provide axial tightness of the core structure.

BRIEF DESCRIPTION OF THE DRAWINGS

For a better understanding of the nature and objects of the present invention reference may be had to the accompanying diagrammatic drawings in which.

DETAILED DESCRIPTION OF THE INVENTION

Figure 1:
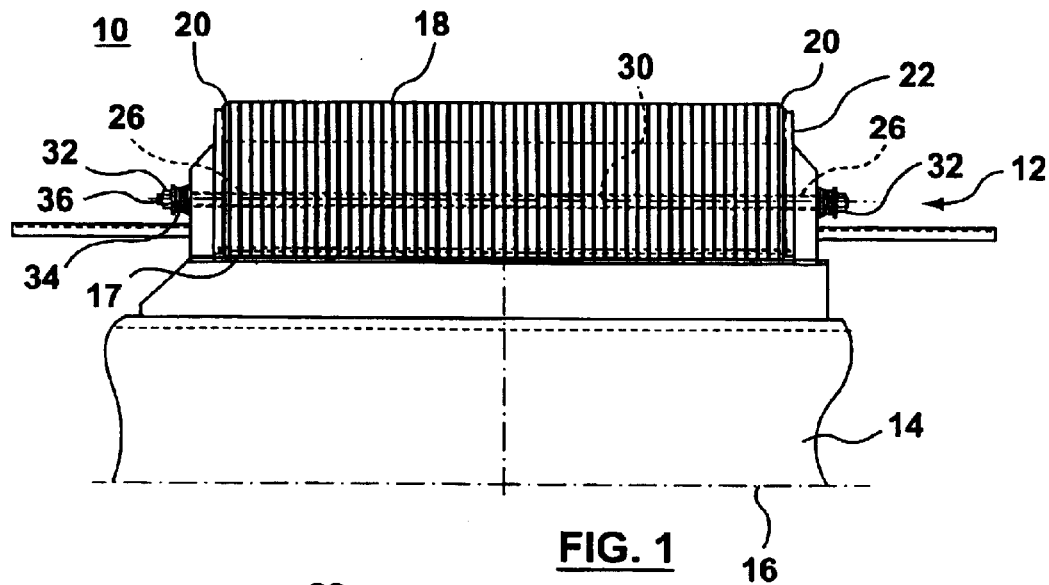
FIG. 1 is a side sectional view of a rotor core structure for a dynamoelectric machine showing a core stud in accordance with the present invention.
Figure 2:
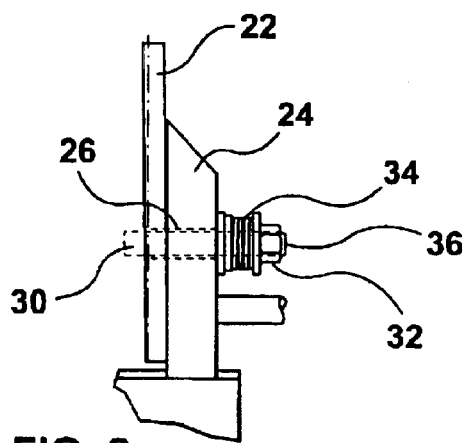
FIG. 2 is an enlarged end view of the rotor core structure showing one end of the core stud of the present invention.
Figure 3:
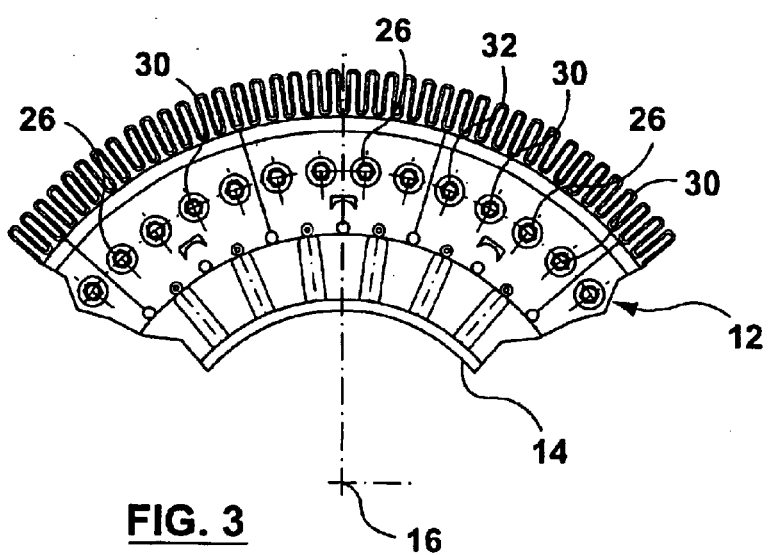
FIG. 3 is an end view of the rotor core structure of FIG. 1 showing a plurality of core studs extending through the core structure.

Referring to FIGS. 1 through 3 there is shown a dynamoelectric machine 10 comprising a rotor 12 having a shaft 14.

The shaft 14 may extend either horizontally or vertically along axis 16. The rotor 12 also comprises a rotor core structure 17. It should be understood that while the details of the present invention are being described with reference to a rotor, that the insulated core studs of the present invention are also applicable to use in a stator core.

The rotor core structure 17 has a plurality of magnetic laminations 18 which may comprise either an iron or steel material and may be coated with an insulation paint or epoxy. The magnetic laminations 18 are spaced closely adjacent to each other and axially along the rotor core structure 17. Adjacent the outer ends of the magnetic laminations 18 are stepped laminations 20. The stepped laminations 20 reduce in steps the outside diameter of the laminations 18 of the core structure 17 to have a diameter corresponding to the outside diameter of supporting finger plates 22 located on axially outer sides of the stepped laminations 20. The finger plates 22 provide axial clamping pressure to the stepped laminations 20 and thereby to the laminations 18. Each of the end plates or flanges 24 is positioned axially on the outer sides of a respective finger plate 22. The end plates provide clamping pressure to the finger plates.

Each of the magnetic laminations 18, stepped laminations 20, finger plates 22 and end plates 24 have through holes 26 that extend therethrough. The through holes 26 are shown in FIG. 3 to be radially spaced about axis 16 of the rotor 12.

An insulated core stud 30 passes through each of the through holes 26. The ends 36 of the insulated core stud 30 extend beyond the end plates 24 and are adapted through threads to receive nuts 32. In between the nuts 32 and the end plates 24 are locking washers 34 which also may be insulated. The nuts 32 are secured to the threaded ends 36 of the insulated core studs 30 so that the nuts 32 and core studs 30 provide an axial tightness against the end plates 24 to axially tighten the laminations 18 and 20 within the core structure 17.

Figure 4:
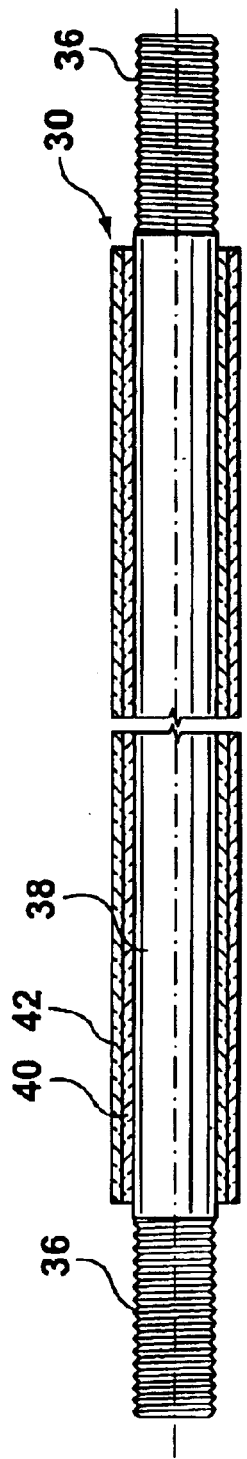
FIG. 4 is a side section view of the core stud of the present invention.
Figure 5:
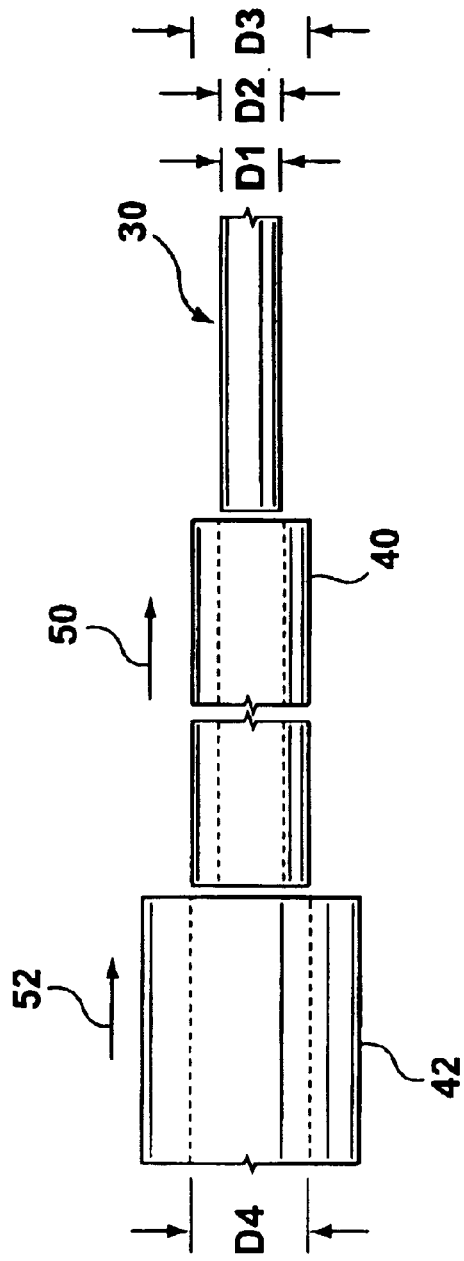
FIG. 5 is an illustrative view of steps in the assembly of the core stud of the present invention.

Referring to FIGS. 4 and 5 the insulated core stud 30 of the present invention comprises opposing threaded ends 36 and a central shaft portion 38. The insulated core stud 30 has a first layer of heat shrinkable tubular insulation or a tubular insulation member 40 that is shrunk fit onto and covers at least a portion of the central shaft portion 38 of the core stud 30 that passes through the laminations 18 and 20. Further, in the preferred embodiment, the first layer of tubular insulation 40 extends on the central shaft portion 38 of the core stud 30 that also passes through the finger plate 22 and end plates 24 so as to electrically insulate the core studs 30 from the laminations 18, 20 and the plates 22, 24.

The insulated core stud 30 further has a second layer of heat shrinkable tubular insulation 42 that is shrunk fit onto and covers at least a portion of the first layer of insulation 40. The central portion 38 of the core stud 30 has a first outside diameter D1. The first layer of heat shrinkable tubular insulation 40 or tubular member 40 has a first inside diameter D2 that is at least equal to or is slightly greater than the first outside diameter D1 of the core stud central portion 38. The first tubular member 40 has a second outside diameter D3. The second layer of heat shrinkable tubular insulation or insulation member 42 has a second inside diameter D4 that is greater than the first inside diameter D2 of the first tubular member 40 and is at least equal to or greater than the second outside diameter D3 of the first tubular member 40 when the first tubular member 40 is shrunk fit onto the core stud central portion 38.

The tubular members 40 and 42 are selected from a material that is electrically insulative and shrinks into engagement with materials located within the tube upon the application of heat. Such a material suitable for this purpose is Heat Shrinkable Tubing for Bus Bar BBI-A Series__ available from 3M.

In the preferred embodiment, the diameter of the central portion 38 of the core stud 30 is in the order of 35 millimeters, however, this diameter can change significantly depending on the clamping requirement for the core laminations. The thickness of each of the layers 40 and 42 of insulation are in the order of 4.5 millimeters. During assembly, the first layer of insulation 40 is slid onto the core stud 30 in the direction as shown by arrow 50 in FIG. 5. Next, heat is applied to the insulation 40 which shrinks the first layer of insulation 40 onto the core stud 30. Once the first layer of insulation is shrunk fit onto the core stud 30, it is unable to move axially along the core stud 30. Subsequent to this, the second layer of insulation 42 is then moved in the direction as exemplified by arrow 52 in FIG. 5 over the first layer of insulation 40 already shrunk fit onto the core stud 30. The second layer of insulation 42 is then heated and as a result shrinks onto the first layer of insulation 40.

By providing two shrunk fit layers of insulation 40 and 42 on a core stud 30, the present invention provides electrical insulation that is readily affixed to the core stud 30. Further, the utilization of the second tubular layer 42 provides mechanical protection to the underlying first tubular layer 40. Hence when the core stud 30 is assembled with respect to the laminations 18, 20, the inner layer of insulation 40 is protected by the outer layer of insulation 42 and the core stud 30 remains electrically insulated from the core 17. This dual layer insulation system is very durable and long lasting. Another advantage with the heat shrink tubing layers 40 and 42 is that they provide uniform thicknesses of insulation over the axial length of the core stud, and are easy to install (much easier to install than having to apply a uniform layer of insulating tape over the core studs). Since the application of a tape of uniform thickness is a manual operation, it is difficult to obtain a uniform thickness, whereas the heat shrink tubing utilized in the present invention would be from an extruded source and of a predetermined thickness and diameter.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A dynamoelectric machine comprising a stator and a rotor, and at least one of the stator and rotor having a core structure comprising:

a plurality of magnetic laminations spaced axially along the core structure;

a plurality of through holes passing axially through the laminations;

an insulated core stud passing through each of the through holes, the insulated core stud comprising opposing ends, a central shaft portion, and a first layer of heat shrinkable tubular insulation shrunk fit onto and covering at least a portion of the central shaft portion of the core stud that passes through the laminations; and, nuts secured to the opposing ends of the insulated core studs whereby the nuts and core studs provide axial tightness of the core structure.

2. The dynamoelectric machine of claim 1 wherein the insulated core stud further comprises at least one second layer of heat shrinkable tubular insulation shrunk fit onto and covering at least a portion of the first layer of heat shrinkable tubular insulation that passes through the laminations.

3. The dynamoelectric machine of claim 2 wherein the core stud central portion has a first outside diameter, the first layer of heat shrinkable tubular insulation comprises a first tubular member of insulation having a first inside diameter at least equal to that of the first outside diameter of the core stud central portion, the first tubular member having a second outside diameter, and at least one second layer of heat shrinkable tubular insulation comprises a second tubular member of insulation having a second inside diameter greater than the first inside diameter of the first tubular member and at least equal to the second outside diameter of the first tubular member when the first tubular member is shrunk fit onto the core stud central portion.

4. The dynamoelectric machine of claim 2 wherein the core structure further comprises first and second end plates disposed on axially opposite ends of the laminations that have through holes through which the core studs pass, the nuts being tightened to cause the end plates to axially tighten the core structure.

5. The dynamoelectric machine of claim 4 wherein the first and second layers of insulation cover portions of the core studs that pass through the end plates.

6. The dynamoelectric machine of claim 2 wherein the core structure further comprises stepped laminations on either end of the plurality of laminations, finger plates each located on axially outer sides of the stepped laminations, end plates each positioned on axially outer sides of a respective finger plate, each of the stepped laminations, end finger plates and end plates having the through holes extending there through and through which the core studs pass, and the nuts being tightened to cause the end plates to axially tighten the core structure.

7. The dynamoelectric machine of claim 6 wherein the first and second layers of heat shrinkable tubular insulation cover portions of the core studs that pass through the stepped laminations, the finger plates and the end plates.

8. The dynamoelectric machine of claim 7 wherein the core stud central portion has a first outside diameter, the first layer of heat shrinkable tubular insulation comprises a first tubular member of insulation having a first inside diameter at least equal to that of the first outside diameter of the core stud central portion, the first tubular member having a second outside diameter, and the second layer of heat shrinkable tubular insulation comprises a second tubular member of insulation having a second inside diameter greater than the first inside diameter of the first tubular member and at least equal to the second outside diameter of the first tubular member when the first tubular member is shrunk fit onto the core stud central portion.

9. An insulated core stud for use in the core structure of at least one of a stator and a rotor of a dynamoelectric machine having a plurality of magnetic laminations spaced axially along the core structure and a plurality of through holes passing axially through the laminations, the insulated core stud being adapted to pass through each of the through holes and comprising:

a central shaft portion and a first layer of heat shrinkable tubular insulation shrunk fit onto and covering at least a portion of the central shaft portion of the core stud that passes through the laminations.

10. The insulated core stud of claim 9 further comprising at least one second layer of heat shrinkable tubular insulation shrunk fit onto and covering at least a portion of the first layer of heat shrinkable tubular insulation that passes through the laminations.

11. The insulated core stud of claim 10 wherein the core structure further comprises stepped laminations on either end of the plurality of laminations, finger plates each located on axially outer sides of the stepped laminations, end plates each positioned on axially outer sides of a respective finger plate, each of the stepped laminations, end finger plates and end plates having the through holes extending there through and through which the core studs pass, and the nuts being tightened to cause the end plates to axially tighten the core structure.

12. The insulated core stud of claim 10 wherein the core structure further comprises first and second end plates disposed on axially opposite ends of the laminations and the first and second layers of insulation cover portions of the core studs that are adapted to pass through the end plates.

13. The insulated core stud of claim 10 wherein the core structure further comprises stepped laminations on either end of the plurality of laminations, finger plates each located on axially outer sides of the stepped laminations, end plates each positioned on axially outer sides of a respective finger plate, each of the stepped laminations, end finger plates and end plates having the through holes extending there through, and the first and second layers of insulation cover portions of the core studs that are adapted to pass through the stepped laminations, the finger plates and the end plates.

\* \* \* \* \*